United States Patent [19]

Vlahogeorge

[11] Patent Number: 4,916,790

[45] Date of Patent: Apr. 17, 1990

[54] BACKER-ROD INSTALLATION TOOL

[75] Inventor: John T. Vlahogeorge, Lafayette, Ind.

[73] Assignee: Control Tool Company, Inc., Lafayette, Ind.

[21] Appl. No.: 383,000

[22] Filed: Jul. 20, 1989

[51] Int. Cl.⁴ .......... B23P 19/02
[52] U.S. Cl. .......... 29/235
[58] Field of Search .......... 29/235, 451, 460; 52/741, 743, 744; 404/64, 65, 74, 87; 7/103

[56] References Cited

U.S. PATENT DOCUMENTS

| | | | |
|---|---|---|---|
| 2,761,199 | 9/1956 | Allen | 29/270 |
| 4,341,007 | 7/1982 | Kruszona | 404/87 |
| 4,528,736 | 7/1985 | Hope et al. | 29/235 |
| 4,578,851 | 4/1986 | Song | 29/235 |
| 4,738,562 | 4/1988 | Howsley | 404/87 |
| 4,765,771 | 8/1988 | Howsley | 404/87 |

*Primary Examiner*—Robert C. Watson
*Attorney, Agent, or Firm*—Woodard, Emhardt, Naughton Moriarty & McNett

[57] ABSTRACT

A tool for forcing a backer-rod to a predetermined depth. A first rotatable wheel is rotatably mounted between the arms of a handle being extendable into a building slot to contact a backer-rod. A pair of outer wheels aré rotatably mounted on either side of the first wheel contacting the outer building surface and limiting the extension of the first wheel into the building slot. The outer wheels are adjustably mounted to the handle to adjustably control the extension of the first wheel. In an alternate embodiment, the outer wheels are replaced by a single outer wheel.

18 Claims, 3 Drawing Sheets

BACKER-ROD INSTALLATION TOOL

BACKGROUND OF THE INVENTION

1. Field of the Invention

This invention is in the field of tools used in constructing buildings, and more specifically those tools associated with the installation of backer-rods.

2. Description of the Prior Art

Commercial buildings have numerous lengthy joints between various surfaces. For example, slabs of marble are spaced apart by joints to allow for expansion and contraction. The joints must be sealed with caulking compound or other suitable material placed adjacent the exterior surface of the slabs. Backer rods, typically produced from polyethylene, are initially installed in the joint at a specified depth with the remaining portion of the joint from the backer-rod to the outside surface then being filled with caulking compound. Building specifications require the installation of the backer-rod at a predetermined depth depending upon the width of the joint.

The typical practice in installing a backer-rod is to initially force the backer-rod into the joint and to then further force the backer-rod to the predetermined depth by means of forcing a putty knife against the rod. Use of such a tool does not provide accurate depth control of the backer-rod since the putty knife does not provide any means for measuring the depth of the slot or joint once the rod is installed. Further, many commercial buildings have thousands and thousands of linear feet of joints requiring an inordinate amount of time for the installation of the backer-rod to the predetermined depth. I have therefore devised a tool which will automatically force the depth to the predetermined depth once the backer-rod is initially installed in the joint. The tool is particularly advantageous in that it allows for the installation of the backer-rod to the predetermined depth at a much quicker and easier pace as compared to the prior technique. Likewise, my tool is particularly adjustable to facilitate the different widths of slots or joints and the accompanying different depths of backer-rods within the joints required in various construction applications.

SUMMARY OF THE INVENTION

One embodiment of the present invention is a tool for installing a sealant backer-rod to a desired depth in a joint between building surfaces comprising a frame for a worker to hold, a joint wheel rotatably mounted to the frame about a first axis of rotation, the wheel having a width in the direction of the axis sized to fit into the joint and further having an outer circumferential surface to contact a sealant backer-rod in the joint as the frame is moved along the joint, and, a backer-rod depth control device on the frame and adjacent the wheel having a first contact surface spaced inwardly from the outer circumferential surface a distance equal to the desired depth of the backer-rod, the control device with the first contact surface operable to contact and move along one of the building surfaces limiting inward movement of the wheel in the joint when the frame is forced toward and along the length of the joint forcing the backer-rod to the desired depth.

It is an object of the present invention to provide a tool for installing a sealant backer-rod to a desired depth in a joint between building surfaces.

A further object of the present invention is to provide a backer-rod installation tool which is adjustable for different widths and depths of joints.

A further object of the present invention is to provide a tool for installing a sealant backer-rod to a desired depth in a quicker and easier pace as compared to the prior techniques.

Related objects and advantages of the present invention will be apparent from the following description.

DESCRIPTION OF THE PREFERRED EMBODIMENTS

Figure 1:
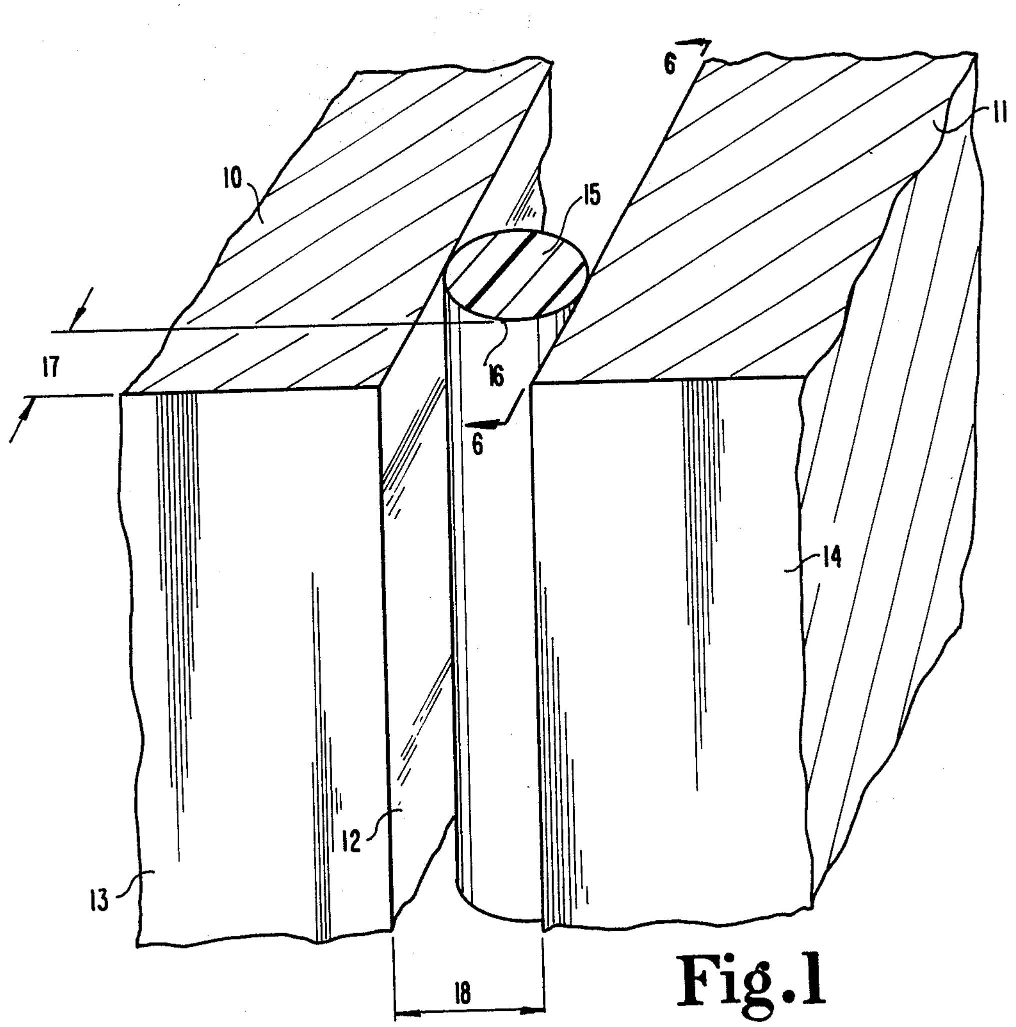
FIG. 1 is a fragmentary view of a sealant backer-rod installed in a joint between two slabs of building materials.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown two slabs 10 and 11 of construction material. The two slabs may, for example, be produced from marble and provide the exterior skin of a office building. Slabs 10 and 11 are spaced apart to provide a control joint for contraction and expansion of the materials. Thus, a joint 12 is provided between both slabs and opens outwardly through the front exterior surfaces 13 and 14, respectively of slabs 10 and 11. A conventional polyethylene, cylindrical backer-rod 15 is shown positioned in joint 12 and has a most forward located portion 16 located a distance 17 from the exterior surfaces 13 and 14. Typically, the depth 17 of backer-rod 15 should be one-half the width 18 of joint 12.

Figure 2:
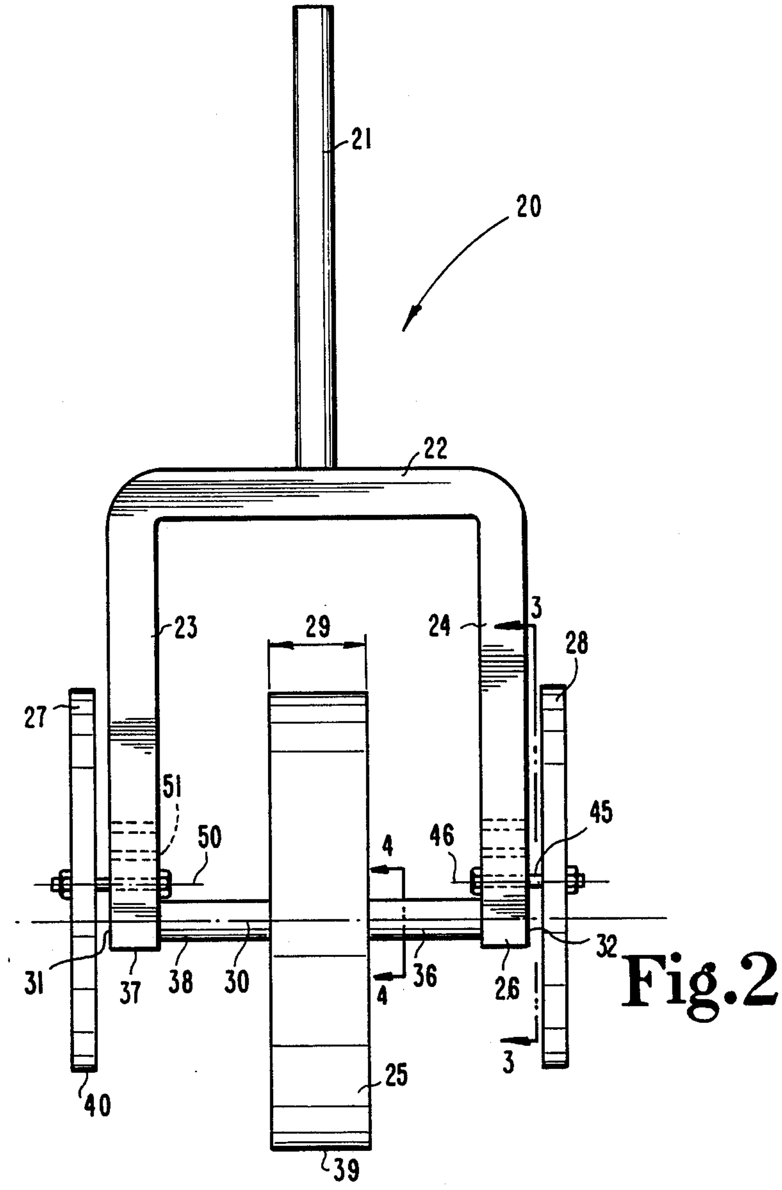
FIG. 2 is a plan view of the preferred embodiment of the tool incorporating the present invention.

Once the backer-rod is forced into joint 12, the tool shown in FIG. 2 is used to further force the backer-rod into the joint so that distance 17 is set at a predetermined value such as one-half of the width of slot 18. Tool 20 includes a handle 21 fixedly mounted to a frame 22 having a depending pair of arms 23 and 24. A middle wheel 25 is rotatably mounted between the arms at the distal ends 37 and 26 of the arms. A pair of wheels 27 and 28 are mounted outwardly of and to arms 23 and 24, respectively. Wheels 27 and 28 ride on the exterior surfaces 13 and 14, whereas wheel 25 is positioned within joint 12 forcing the backer-rod to the predetermined and desired depth. The depth is controlled by the distance between the outer circumferential surface of wheel 25 and the outer circumferential surfaces of wheels 27 and 28. The structure shown in FIG. 2 for the tool is but one possible means for controlling the distance between the outer portion of the middle wheel 25 and the outer portion of wheels 27 and 28, it being understood that other structures may be similarly employed to practice my invention.

Figure 3:
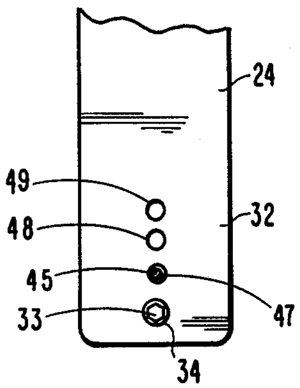
FIG. 3 is a cross-sectional view taken along the line 3—3 of FIG. 2 and viewed in the direction of the arrows.
Figure 4:
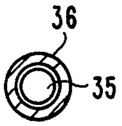
FIG. 4 is a cross-sectional view taken along the line 4—4 of FIG. 2 and viewed in the direction of the arrows.

The middle wheel 25 has a width 29 less than the width 18 of joint 12 to facilitate the insertion of the middle wheel into the joint. Wheel 25 is rotatably mounted to arms 23 and 24 about a first axis of rotation 30. Many means may be used to rotatably mount wheel 25. In the embodiment shown in FIGS. 2 and 3, a bolt 35 (FIG. 4) extends through both arms 23 and 24, and also through the center of wheel 25. The hexagonally shaped head 33 of bolt 35 is received in the counter-bored recess 34 of the outer surface 32 of arm 24 with the shank of the bolt then passing further through arm 24, through wheel 25 and then through a counter-bored hole opening through outer surface 31 of arm 23. A hexagonally shaped nut may be provided in the counter-bored hole contained at the distal end 37 of arm 23. A pair of sleeves 38 and 36 surround bolt 35 and are positioned, respectively, between wheel 25 and arm 23 and wheel 25 and arm 24. For example, sleeve 36 is shown surrounding bolt 35 being positioned between the mutually facing surfaces of wheel 25 and arm 24.

Figure 6:
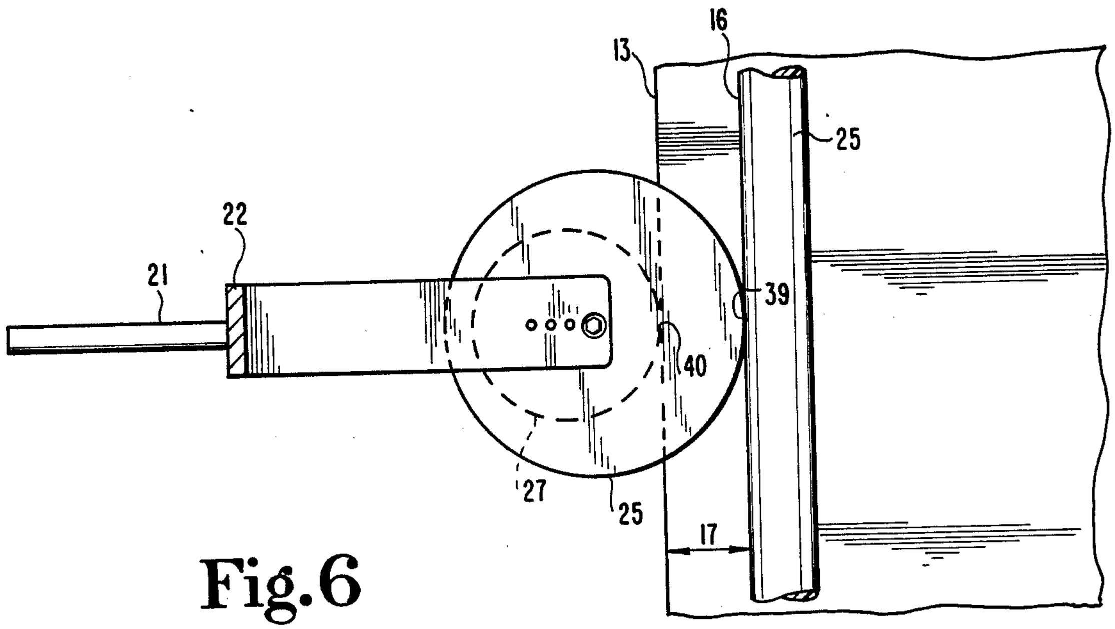
FIG. 6 is a cross-sectional view of the joint of FIG. 1 with the tool of FIG. 2 inserted in the joint.

Since the width of joint 12 will vary depending on the particular building application, bolt 35 may be quickly disassembled from arms 23 and 24 allowing for the removal of wheel 25 having width 29. A second wheel may then be installed onto the bolt 35 between arms 23 and 24 having a width different from width 29. In such a case, sleeves 36 and 38 must be changed to facilitate the greater or lesser width of the new wheel. For example, in the event the width of the wheel is increased, then the lengths of each sleeve 36 and 38 must be decreased. The purpose of sleeves 36 and 38 is to prevent the wheel from wobbling and to center the wheel between arms 23 and 24. Thus, if the width 29 of wheel 25 is decreased, then the lengths of each sleeve 36 and 38 are increased. The outer circumferential surface 39 of wheel 25 contacts and rolls along sealant rod 15 as the frame is moved the length of joint 12. Continued force and movement of the frame toward rod 15 will cause the middle wheel 25 to force the backer-rod deeper until wheels 27 and 28 engage surfaces 13 and 14 thereby preventing further movement of the backer-rod into the joint. Thus, referring to FIG. 6, the handle 21 fixed to frame 22 is shown as extending perpendicularly outward from surface 13 of slab 10 with the outer circumferential surface 39 of the middle wheel 25 contacting the most forward portion 16 of backer-rod 25 while the outer circumferential surface 40 of wheel 27 contacts surface 13 of slab 10. The depth 17 is equal to the distance between locations 39 and 40 in a direction perpendicular to the axis of rotation.

Wheels 27 and 28 may be remounted to relocate the axis of rotation of each wheel. In such a manner, the distance between the outer circumferential surface of the outer wheels may be changed relative to the outer circumferential surface of the middle wheel 25. Both wheels are rotatably mounted by means of a bolt or similar means. The mounting of wheel 28 will now be described, it being understood that a similar description applies to the mounting of wheel 27. Bolt 45 passes through arm 24 and through the center of wheel 28 allowing the wheel to rotate along axis of rotation 46. The head of the hexagonally shaped bolt may be positioned adjacent the surface of arm 24 facing wheel 25 with a hexagonally shaped nut then being placed outwardly of wheel 28 and threadedly fastened onto the distal end of bolt 45 securing the wheel to arm 24. A means must be used to position wheel 28 apart from arm 24 to prevent contact between wheel 28 and the arm as the wheel is rotated. For example, a sleeve may surround the shank of bolt 45 being positioned between arm 24 and wheel 28 in a manner similar to sleeve 36. Alternatively, a shoulder bolt may be used with the shoulder of the bolt contacting wheel 28 and forcing the wheel apart from arm 24. The shank of the bolt 35 (FIG. 3) is shown as passing through hole 47 of arm 24. Additional bolt holes 48 and 49 are spaced upwardly from hole 45 and are aligned vertically as viewed in FIG. 3 with holes 47 and 34. Thus, in the event the depth 17 of the backer-rod is to be increased, then bolt 45 is removed from hole 47 and installed in either hole 48 or hole 49. Similarly, the axis of rotation of wheel 27 is shifted from axis 50 to an axis of rotation which is the same as the axis of rotation for wheel 28. Thus, if bolt 45 is moved to the middle hole 48, then the bolt mounting wheel 27 is shifted to the middle hole 51.

Figure 5:
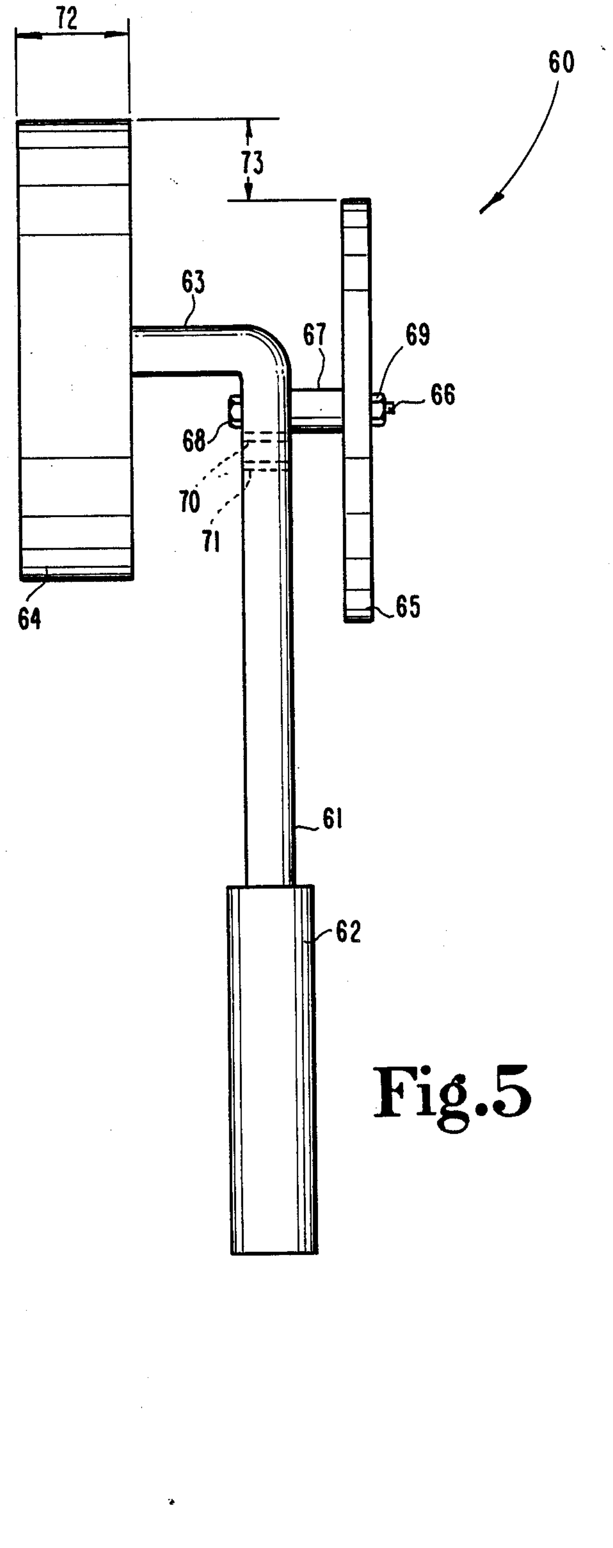
FIG. 5 is a plan view of an alternate embodiment of the tool incorporating my new invention.

The preferred embodiment of the tool for installing the backer-rod is shown in FIG. 2, and is designed for contacting both surfaces extending along the length of the slot. In many cases, the slot will extend along a corner, and thus all three wheels of the tool shown in FIG. 2 are unnecessary. Thus, the alternate embodiment of the tool is shown in FIG. 5 having only a single wheel for contacting the exterior surface of the slab of material extending the length of the joint. Tool 60 includes a main frame 61 with a handle 62 formed thereon for the worker to grasp and pull the tool along the length of the joint having the backer-rod inserted therein. The distal end 63 of frame 61 extends outwardly at a right angle to the main portion of frame 61 and has rotatably mounted thereon a wheel 64 corresponding to wheel 25 of tool 20. The width 72 of wheel 64 must therefore be less than the width of the slot into which wheel 64 is to be extended. Wheel 64 may be removed from distal end 63 and a different wheel having a greater or smaller width as compared to width 72 installed onto the frame. A variety of conventional means may be used to rotatably mount wheel 64 to distal end 63. For example, the end of distal end 63 may be reduced in diameter forming a shoulder resting against one side of wheel 64 with the reduced end of distal end 63 then extending freely through wheel 64 and being in meshing engagement, at the opposite side of the wheel, with the hexagonally shaped nut, or similar means, thereby securing the wheel onto the frame, and preventing the wheel from wobbling as the outer circumferential surface of the wheel is moved against the backer-rod forcing the backer-rod to the desired depth.

A second wheel 65, corresponding to either wheel 27 or wheel 28 is rotatably mounted to frame 61 by conventional means. For example, in the embodiment shown in FIG. 5, a bolt 66 extends through wheel 65, sleeve 67 and frame 61 with the head 68 of the bolt being positioned on the opposite side of frame 61 and with the hexagonally shaped nut 69 securing the wheel to the bolt. Sleeve 67 spaces wheel 65 apart from frame 61 preventing the wheel from contacting the frame as it is rotated and rolls against the outer surface 13 or 14 extending to one side of the joint. As in the case of the embodiment depicted in FIG. 2, tool 60 is provided with alternative mounting holes 70 and 71 allowing the axis of rotation and bolt 66 to be moved downwardly as viewed in FIG. 5 to increase the distance 73 between the outer circumferential surfaces of wheels 64 and 65 with the distance 73 corresponding to the desired depth of the backer-rod within the joint. Tool 60 is particularly useful in forcing the backer-rod to the desired depth along corners and in joints provided in a staircase.

Many variations in the present invention are contemplated and included herein. For example, the rotational axis 46 may be offset from rotational axis 50 (FIG. 2) so long as the distance 17 between wheels 25 and 27 is the same as distance 17 between wheels 25 and 28. Likewise, more than two wheels may be provided for contacting the exterior surface of the building. Alternatively, small skids or skis may be used in lieu of wheels 27, 28 and 65. p While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A tool for installing a sealant backer-rod to a desired depth in a joint between building surfaces comprising:

a frame for a worker to hold;

a joint wheel rotatably mounted to said frame about a first axis of rotation, said wheel having a width in the direction of said axis sized to fit into said joint and further having an outer circumferential surface to contact a sealant backer-rod in said joint as said frame is moved along said joint;

backer-rod depth control means on said frame and adjacent said wheel having a first contact surface spaced inwardly from said outer circumferential surface a distance equal to the desired depth of said backer-rod, said control means with said first contact surface operable to contact and move along one of said building surfaces limiting inward movement of said wheel in said joint when said frame is forced toward and along the length of said joint forcing said backer-rod to said desired depth; and, first adjustment means on said frame operable to adjust the inward spacing between said first contact surface and said outer circumferential surface equal to said desired depth.

2. The tool of claim 1 wherein:

said backer-rod depth control means includes a second contact surface spaced equally inward from said outer circumferential surface as said first contact surface, said wheel is located between said first contact surface and said second contact surface which contact both of said building surfaces as said wheel forces said backer-rod to the desired depth in said joint.

3. The tool of claim 2 and further comprising:

second adjustment means on said frame operable to adjust the inward spacing between said second contact surface and said outer circumferential surface equal to said desired depth.

4. The tool of claim 3 and further comprising:

mounting means on said frame rotatably mounting said wheel to said frame and operable to allow removal of said wheel and mounting of another having a different width than said width of said wheel.

5. The tool of claim 4 wherein:

said backer-rod depth control means includes a first wheel and a second wheel rotatably mounted to said frame about a second axis of rotation parallel to said first axis of rotation and positioned with said joint wheel therebetween, said first contact surface and said second contact surface located respectively on said first wheel and said second wheel, said first wheel and said second wheel rolling along said building surfaces and said joint wheel rolling along said backer-rod as said frame is forced toward and along said joint.

6. The tool of claim 5 wherein:

said first adjustment means includes a first set of axle holes on said frame located different distances from said first axis, said second adjustment means includes a second set of axle holes on said frame also located said different distances from said first axis, said first wheel and said second wheel have axles mountable to respectively one of said first set of axle holes and one of said second set of axle holes to set said desired depth.

7. The tool of claim 1 and further comprising:

mounting means on said frame rotatably mounting said wheel to said frame and operable to allow removal of said wheel and mounting of another having a different width than said width of said wheel.

8. A tool for installing a sealant backer-rod to a desired depth in a joint between building surfaces comprising:

a frame;

an axle on said frame;

a first wheel rotatable on said axle about an axis of rotation and removably mounted to said frame to allow for a different size of wheel to be mounted thereon, said first wheel having an outer edge portion contactable against said backer-rod to force said backer-rod to a desired depth in a joint between building surfaces;

a first stop surface provided on said frame spaced apart from said outer edge portion a distance perpendicular to said axis equal to the desired depth of said backer-rod; and, adjustment means operable to adjust said distance between said first stop surface and said outer edge portion equal to said desired depth.

9. The tool of claim 8 and further comprising:

a second wheel rotatable mounted to said frame and having said stop surface located circumferentially thereon.

10. The tool of claim 9 and further comprising:

a second stop surface provided on said frame spaced apart from said outer edge portion a distance perpendicular to said axis equal to the desired depth of said backer-rod.

11. The tool of claim 10 and further comprising:

a third wheel rotatable mounted to said frame and having said second stop surface located circumferentially thereon.

12. The tool of claim 11 wherein:

said first wheel is located between said second wheel and said third wheel all of which have parallel axes of rotation.

13. The tool of claim 12 wherein:

said first wheel has a width in the direction of said axis of rotation sized to fit into said joint.

14. The tool of claim 13 wherein:

said second wheel and said third wheel are removably mounted to said frame at various locations from said axis of rotation to control the distance between said first stop surface and said second stop surface relative to said outer edge portion of said first wheel allowing said desired depth to be selected.

15. A tool for installing a rod to a desired depth in a joint between building surfaces comprising:

a frame for holding in the hand;

a rod contact surface extending in the direction of a first axis, said rod contact surface provided on said frame and contactable against said rod to force said rod to a desired depth in a joint between building surfaces;

a first stop surface contactable against at least one of said building surfaces and provided on said frame being spaced apart from said rod contact surface a distance perpendicular to said axis equal to the desired depth of said rod; and, adjustment means operable to adjust said distance between said first stop surface and said rod contact surface equal to said desired depth.

16. The tool of claim 15 and further comprising:

a joint wheel rotatably mounted to said frame about said axis and having a width in the direction of said axis sized to fit into said joint and further having said rod contact surface circumferentially thereon to contact said rod in said joint as said frame is moved along said joint.

17. The tool of claim 16 and further comprising:

a second stop surface spaced equally from said rod contact surface as said first stop surface, said wheel is located between said first stop surface and said second stop surface which contact both of said building surfaces as said wheel forces said rod to the desired depth in said joint.

18. The tool of claim 17 and further comprising:

a pair of wheels having respectively said first stop surface and said second stop surface thereon with said pair of wheels being rotatably mounted to said frame about a second axis parallel to said first axis, said pair of wheels rolling along said building surfaces and said joint wheel rolling along said rod as said frame is forced toward and along said joint.

* * * * *